(12) United States Patent
Sethuraman et al.

(10) Patent No.: US 8,325,409 B2
(45) Date of Patent: Dec. 4, 2012

(54) PERISCOPING VANES FOR SMART WINDOWS

(75) Inventors: Srinivasan Sethuraman, Milpitas, CA (US); Clayton Ka Tsun Chan, Fremont, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 551 days.

(21) Appl. No.: 12/484,721

(22) Filed: Jun. 15, 2009

(65) Prior Publication Data

US 2010/0313476 A1  Dec. 16, 2010

(51) Int. Cl.
G02F 1/15 (2006.01)
(52) U.S. Cl. .......... 359/265; 49/501; 359/269; 359/275; 359/581; 359/586
(58) Field of Classification Search ............ 49/92.1, 49/501; 359/256, 265–275, 581, 583, 586; 439/493, 857
See application file for complete search history.

(56) References Cited

U.S. PATENT DOCUMENTS

| | | | |
|---|---|---|---|
| 2,549,167 A * | 4/1951 | Brubaker | 359/596 |
| 3,324,620 A | 6/1967 | Requena | |
| 3,384,147 A | 5/1968 | Smith | |
| 5,688,585 A * | 11/1997 | Lingle et al. | 428/216 |
| 6,266,193 B1 * | 7/2001 | Saif et al. | 359/582 |
| 6,972,888 B2 | 12/2005 | Poll et al. | |
| 7,859,753 B2 * | 12/2010 | Wang | 359/489.19 |
| 7,875,341 B2 * | 1/2011 | Toyoshima et al. | 428/212 |
| 8,014,050 B2 * | 9/2011 | McGrew | 359/15 |
| 2005/0217804 A1 * | 10/2005 | Wilkins | 160/113 |
| 2008/0013177 A1 * | 1/2008 | Hatano et al. | 359/586 |
| 2008/0174848 A1 * | 7/2008 | Kim et al. | 359/256 |
| 2008/0239420 A1 * | 10/2008 | McGrew | 359/11 |
| 2009/0052041 A1 * | 2/2009 | Watanabe et al. | 359/586 |
| 2010/0329851 A1 * | 12/2010 | Nilsson | 415/151 |
| 2011/0120843 A1 * | 5/2011 | Wunnicke et al. | 200/181 |

FOREIGN PATENT DOCUMENTS

| | | |
|---|---|---|
| EP | 0796975 | 9/1997 |
| WO | 00/60407 | 10/2000 |
| WO | 2005/059621 | 6/2005 |

OTHER PUBLICATIONS

International Search Report and Written Opinion dated Sep. 16, 2010, from Application No. PCT/US2010/037642.

* cited by examiner

*Primary Examiner* — Jerry Redman
(74) *Attorney, Agent, or Firm* — Weaver Austin Villeneuve & Sampson LLP

(57) ABSTRACT

Methods and devices are provided for selectively allowing light to pass through a substantially transparent substrate or blocking the light, at least to some degree. Some embodiments provide a plurality of reflective vanes that can be positioned in at least two positions. According to some such implementations, when the vanes are in an open position, incident light is allowed to pass through the window. The light may reflect from two or more vanes before passing through the window. When a sufficient voltage is applied between vane electrodes and other electrodes, the vanes are pulled down, reflecting back at least some of the incident light. The voltage may be controlled according to detected temperature, ambient light intensity, etc.

21 Claims, 13 Drawing Sheets

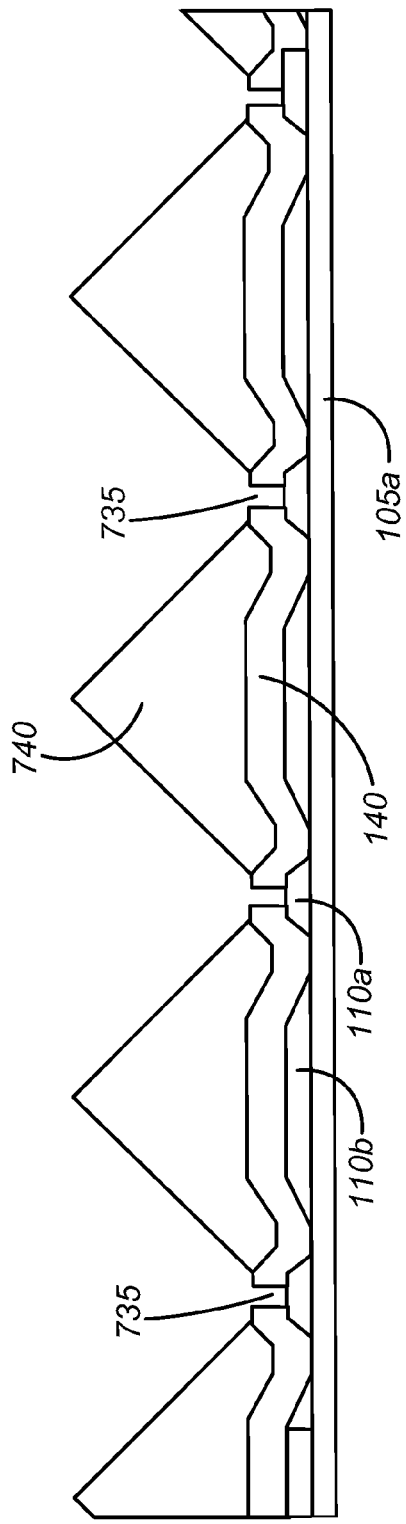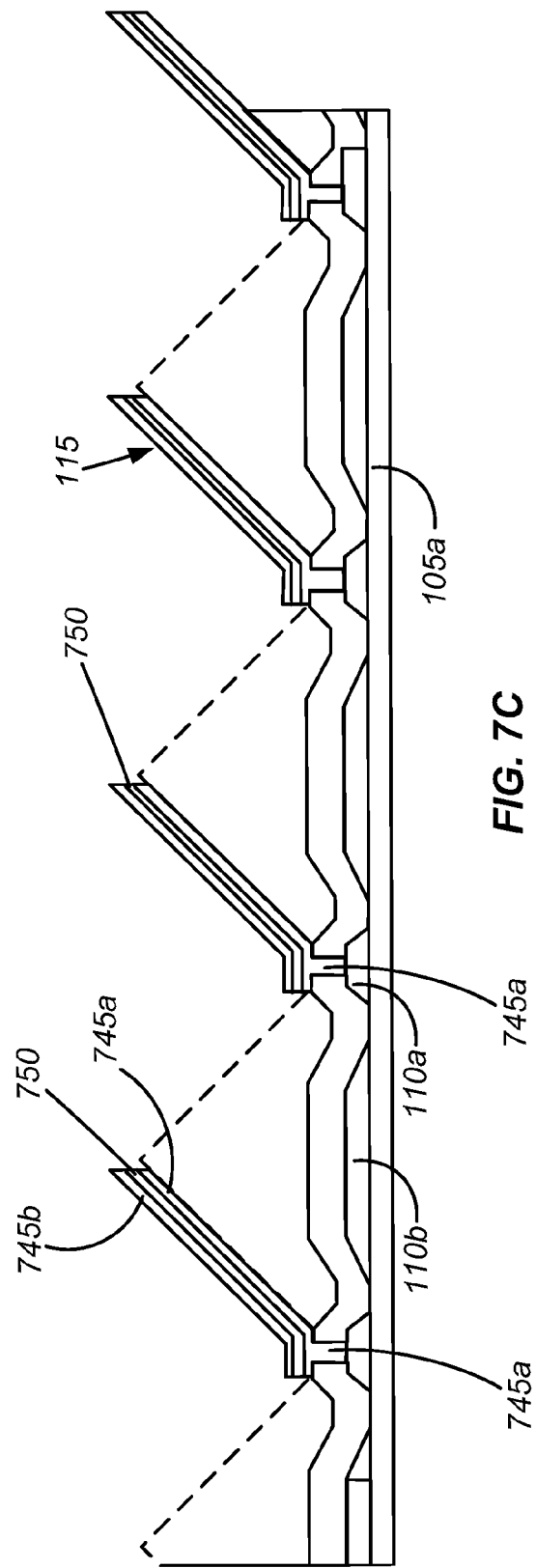

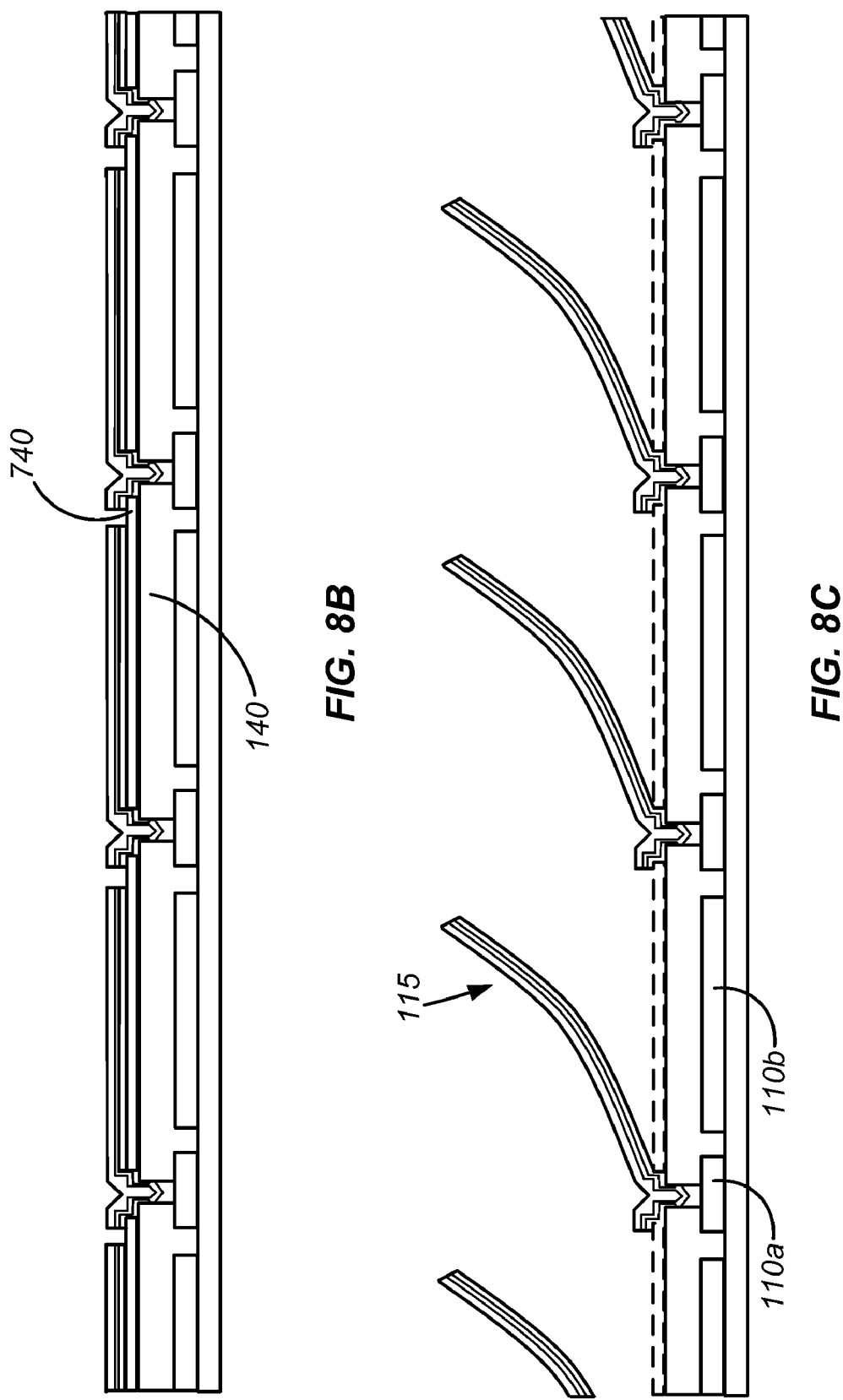

PERISCOPING VANES FOR SMART WINDOWS

FIELD OF THE INVENTION

This application relates generally to windows.

BACKGROUND OF THE INVENTION

Energy consumption in buildings is strongly influenced by heating and cooling demands. To the extent that building owners can allow sunlight to enter a home during cold days and to block sunlight from entering the building during hot days, building energy consumption will drop. Some previous methods for addressing this issue involve devices such as curtains or shades, which block sunlight after it enters the home. Other solutions involve exterior shutters, which at least partially block wind, sunlight, etc. before they enter a window. It would be desirable to provide improved methods and devices for selectively allowing sunlight to enter a window or blocking sunlight from entering the window.

SUMMARY

Methods and devices are provided for selectively allowing light to pass through a substantially transparent substrate or blocking the light, at least to some degree. Some embodiments provide a plurality of reflective vanes that can be positioned in at least two positions. According to some such implementations, when the vanes are in an open position, incident light is allowed to pass through the window. The light may reflect from two or more vanes before passing through the window. When a sufficient voltage is applied between vane electrodes and other electrodes, the vanes are pulled down, reflecting back at least some of the incident light.

In some embodiments, a control system may be configured to apply a voltage to a plurality of electrodes that causes electrical forces between a plurality of vanes and the plurality of electrodes to be greater than restoring forces of the plurality of vanes. The electrical force may be sufficient to move the first plurality of vanes from an open position to a closed position proximate the plurality of electrodes. The control system may be configured to apply a range of voltages to the electrodes, some of which will only cause the vanes to be partially closed. Some voltages may cause electrical forces that are less than the restoring forces of the plurality of vanes, thereby allowing the plurality of vanes to remain in, or to return to, an open position. The plurality of vanes may be configured to reflect ambient light (e.g., through the plurality of electrodes) when in the open position and to block ambient light when in a closed position.

Some embodiments described herein provide an apparatus that includes the following elements: a first substantially transparent substrate; a first plurality of substantially transparent electrodes attached to the first substrate; a first plurality of reflective and electrically conductive vanes having first ends that are electrically coupled to first areas of the first plurality of electrodes; and a control system configured to apply a first voltage between the first areas of the first plurality of electrodes and second areas of the first plurality of electrodes at a first time. The first voltage may cause first electrical forces between the first plurality of vanes and second areas of the first plurality of electrodes to be greater than restoring forces of the first plurality of vanes. Accordingly, the first electrical forces may be sufficient to move the first plurality of vanes from an open position to a closed position proximate the second areas of the first plurality of electrodes. The first plurality of vanes may be configured to reflect ambient light through the first plurality of electrodes when in the open position and to block ambient light when in the closed position.

The apparatus may be part of a window. In some such embodiments, the window may include first and second window areas. The first window areas may, for example, pass ambient light of a first angle range and the second window areas may block ambient light of the first angle range.

In some embodiments, the window may be configured to selectively block or pass predetermined wavelengths of light. For example, the window may be configured to block or pass ultraviolet and/or infrared wavelengths of light. According to some such embodiments, the vanes may reflect light that is visible to humans but may pass predetermined wavelengths of light outside the visible range. Alternatively, or additionally, the window may comprise one or more films, filters, etc., configured to block or pass predetermined wavelengths of light.

The control system may be further configured to apply a second voltage between the first areas of the first plurality of electrodes and the second areas of the first plurality of electrodes at a second time. The second voltage may cause second electrical forces that are less than the restoring forces of the first plurality of vanes and that allow the first plurality of vanes to return to the open position. The first time and the second time may be predetermined times.

The apparatus may include a substantially transparent insulating layer formed on the second areas of the electrodes. The first plurality of vanes may be proximate the insulating layer when in the closed position. The control system may be further configured to position the first plurality of vanes in a plurality of open positions. Each of the plurality of open positions may correspond to a different angle between the first plurality of vanes and the first substrate.

The apparatus may include a temperature sensor (or the like) for determining the temperature and/or temperature changes. The control system may be configured to open and close the first plurality of vanes in response to the temperature and/or temperature changes.

The first plurality of vanes and the first plurality of electrodes may comprise electromechanical systems. In some such embodiments, the electromechanical systems may comprise microelectromechanical ("MEMS") systems.

Each of the first plurality of vanes may comprise a first side and a second side. When in the open position, at least some of the first plurality of vanes may be configured to reflect ambient light from a first side of a first vane to a second side of a first adjacent vane and through the second area of the electrodes.

In some embodiments, the apparatus also includes the following elements: a second substantially transparent substrate; a second plurality of substantially transparent electrodes attached to the second substrate; and a second plurality of reflective and electrically conductive vanes having first ends that are electrically and mechanically coupled to first areas of the second plurality of electrodes. Each of the second plurality of vanes may comprise a first side and a second side. When in the open position, at least some of the second plurality of vanes may be configured to reflect ambient light from a first side of a second vane to a second side of a second adjacent vane of the second plurality of vanes. The second adjacent vane of the second plurality of vanes may be configured to reflect the ambient light to the first side of one of the first plurality of vanes.

Some smart windows described herein include the following elements: substantially transparent support means; light reflecting means; and control means configured for providing a first electrical force at a first time that is greater than a restoring force of the light reflecting means and sufficient to move the light reflecting means from an open position to a closed position.

The control means may also be configured to control first window areas to pass ambient light of a first angle range and to control second window areas to block ambient light of the first angle range. The smart window may further comprising means for determining the temperature and/or changes in the temperature (e.g. a temperature sensor or the like). The control means may be configured to open and close the first plurality of vanes in response to the temperature and/or to changes in the temperature. The smart window may also include means for blocking or passing predetermined wavelengths of light.

The light reflecting means may be configured to reflect ambient light through the support means when the light reflecting means is in the open position. The light reflecting means may be further configured to block ambient light when the light reflecting means is in the closed position. The control means may be further configured to provide a second electrical force at a second time that is less than the restoring force and that allows the light reflecting means to return to the open position. The first time and the second time may be predetermined times. The light reflecting means may, for example, comprise electromechanical systems, which may comprise MEMS in some embodiments.

Some methods described herein include the following steps: forming patterns of substantially transparent conductive material on a substantially transparent substrate; depositing an insulating layer on the patterns of substantially transparent conductive material; depositing sacrificial material; etching the sacrificial material; forming vias to the conductive material; depositing vane material on the sacrificial material, the vane material being reflective and conductive; patterning the vane material; and releasing the sacrificial material to allow the vane material to move to a rest position at an angle with respect to the substrate. At least a portion of the vane material may be deposited in the vias to the conductive material.

The process of etching the sacrificial material may comprise forming angled surfaces upon which the vane material is deposited. For example, the angled surfaces may be positioned between 30 degrees and 50 degrees relative to a plane of the substrate.

Some methods described herein involve depositing material at varying stresses. According to some such methods, the vane material may be deposited at varying stresses. Some methods may involve depositing conductive hinge material at varying stresses in the vias to the conductive material. The vane material may be deposited on at least a portion of the hinge material.

These and other methods of the invention may be implemented by various types of hardware, software, firmware, etc. For example, some features of the invention may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM).

Some machine-readable media may, for example, include instructions for controlling a smart window either to reflect or to transmit substantially more light according to temperature information. Other machine-readable media may include instructions for fabricating smart windows or components thereof.

BRIEF DESCRIPTION OF THE DRAWINGS

FIGS. 7B and 7C illustrate two stages of the method of FIG. 7A.

FIGS. 8B and 8C illustrate two stages of the method of FIG. 8A.

DETAILED DESCRIPTION

While the present invention will be described with reference to a few specific embodiments, the description and specific embodiments are merely illustrative of the invention and are not to be construed as limiting the invention. Various modifications can be made to the described embodiments without departing from the true spirit and scope of the invention as defined by the appended claims. For example, the steps of methods shown and described herein are not necessarily performed in the order indicated. It should also be understood that the methods of the invention may include more or fewer steps than are indicated. In some implementations, steps described herein as separate steps may be combined. Conversely, what may be described herein as a single step may be implemented in multiple steps.

Similarly, device functionality may be apportioned by grouping or dividing tasks in any convenient fashion. For example, when steps are described herein as being performed by a single device (e.g., by a single logic device), the steps may alternatively be performed by multiple devices and vice versa.

Various methods and devices will now be described for controlling the amount of light that is allowed to pass through a substantially transparent substrate. The substantially transparent substrate may be used, e.g., to form a window. Accordingly, the corresponding devices may sometimes be referred to herein as "smart windows" or the like. To avoid repetition, the devices may sometimes be referred to herein simply as "windows."

Some smart windows may include a plurality of reflective vanes that can be positioned in at least two positions. According to some such implementations, when the vanes are in an open position, incident light is allowed to pass through a substantially transparent substrate that forms part of the window. The light may reflect from two or more vanes before passing through the window. When a sufficient voltage is applied between vane electrodes and other electrodes, the vanes are pulled towards the substantially transparent substrate, reflecting back at least some of the incident light. Accordingly, at least some of the incident light may be prevented from entering the window.

Figure 1:
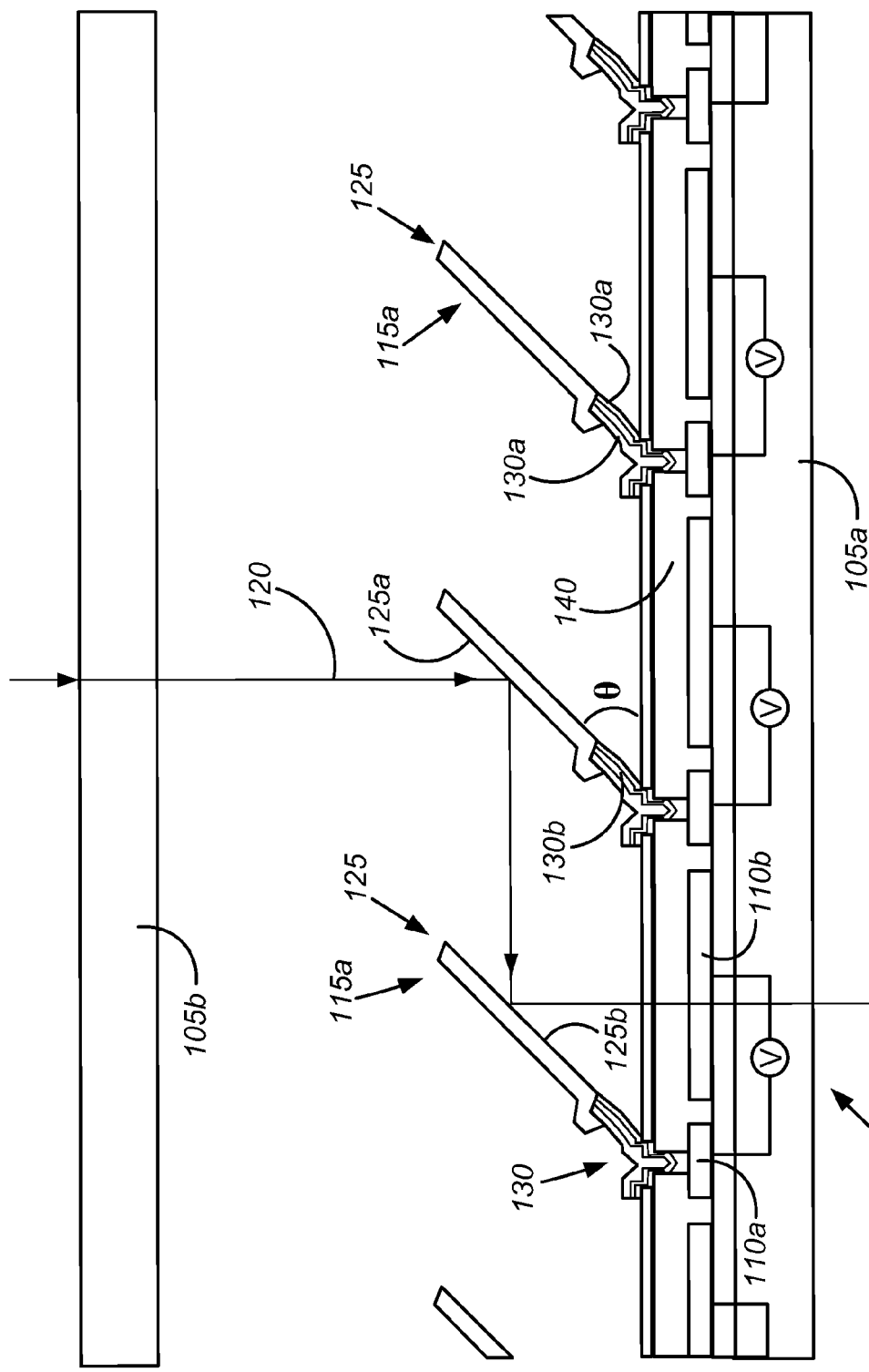
FIG. 1 depicts a cross-section of one example of a smart window, with vanes in an open position.
Figure 5A:
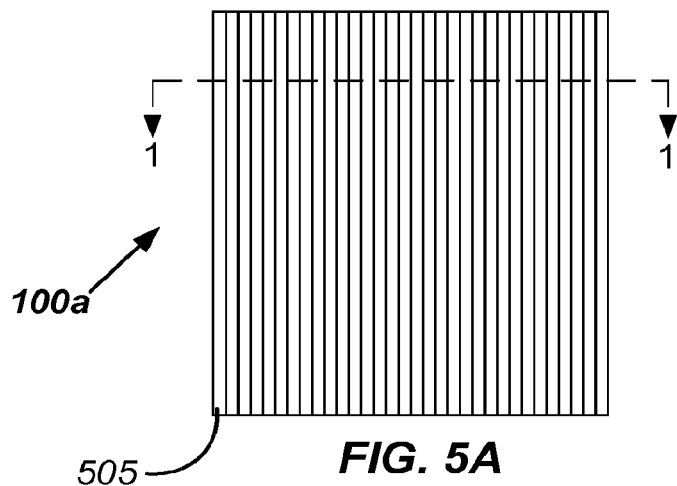
FIGS. 5A-5C provide examples of how a smart window may be divided into separately addressable zones.
Figure 5B:
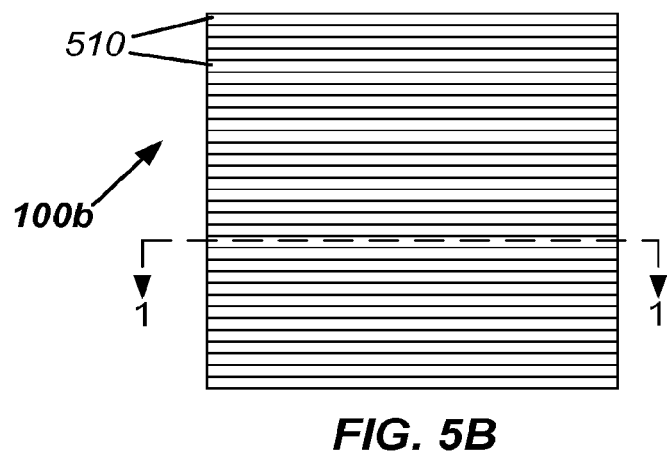
Figure 5C:
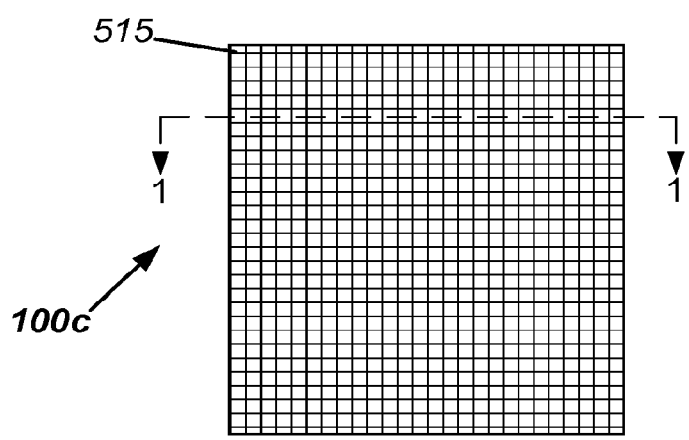

An example of a smart window will now be described with reference to FIG. 1. In this example, a cross-section of a portion of smart window 100 is shown. FIGS. 5A through 5C show examples of lines through which this cross-section, as well as other cross-sections provided herein, may be taken. Smart window 100 includes substantially transparent substrates 105a and 105b. Substrates 105a and 105b may be formed of various materials, including glass, polymers such as plastic, polycarbonate, etc. In this example, smart window 100 includes electrodes 110a and 110b, vanes 115a, etc., formed on only one of the substantially transparent substrates, substrate 105a. As described below with reference to FIG. 10, however, some smart window embodiments provided herein have such features formed on both substrate 105a and 105b.

Here, vanes 115a are shown in an open position. Accordingly, light 120 is permitted to pass through substantially transparent substrates 105b and 105a. In this example, vanes 115a include reflective portion 125 and hinge portion 130. Reflective portion 125 includes reflective surface 125a, which reflects light 120 to reflective surface 125b, which in turn reflects light 120 through substantially transparent electrodes 110b and substantially transparent substrate 105a.

Hinge portion 130 of vanes 115a may be formed in various ways, but should include at least some conductive material. Here, hinge portion 130 includes insulating material 130b sandwiched between conductive layers 130a. Accordingly, hinge portions 130 can conduct electricity to or from electrodes 110a. Conductive layers 130a may be formed from aluminum, copper, iron, steel, etc. Insulating material 130b may be any appropriate dielectric material, e.g., silicon dioxide ($SiO_2$), aluminum oxide ($Al_2O_3$), etc. Reflective portion 125 may comprise one or more of various reflective materials, such as reflective metals. For example, reflective portion 125 may comprise aluminum, iron, steel, copper, etc. Substantially transparent electrodes 110a and/or 110b may be formed from any of various substantially transparent conductive material, such as titanium oxide (TiO), zinc oxide (ZnO), indium tin oxide (ITO), etc. Insulating layer 140 may be any suitable dielectric material.

In alternative embodiments, vanes 115a may have different configurations. In some examples described below, vanes 115a are formed substantially as hinge portions 130 are formed. The conducting and insulating layers may extend throughout the length of vanes 115a.

In some embodiments, vanes 115a and other features are made to be relatively small. Some embodiments, for example, provide vanes 115a that are too small to be seen by the unaided human eye. For example, vanes 115a may be on the order of microns, tens of microns or hundreds of microns in length. In some such implementations, vanes 115a are between 10 and 50 microns in length. Some such embodiments are microelectromechanical systems ("MEMS") devices that may be formed using processes similar to those used in semiconductor fabrication. Examples of some such processes will be described below.

Angle $\theta$ between vanes 115a and substantially transparent substrate 105a is preferably kept substantially similar in adjacent vanes, so that the angle of light 120 incident upon substrate 105b is substantially similar to the angle of light emerging from substrate 105a. Such configurations can help to minimize the distortion of images viewed through smart window 100. In this example, angle $\theta$ is approximately 45 degrees. In alternative embodiments, angle $\theta$ may differ. In some such embodiments, angle $\theta$ may be in the range of 30 degrees to 60 degrees, or in some other angle range.

In some implementations, vanes 115a are in a fully open position when they are at rest. In such implementations, some type of external force must be applied in order to overcome a restoring force and move vanes 115a. In various embodiments, such an external force may be applied by applying a sufficient voltage across substantially transparent electrodes 110a and 110b. If the applied voltage is sufficient, the resulting electrical force will be sufficient to move vanes 115a towards electrodes 110b and close vanes 115a, either partially or completely.

In some embodiments, a control system may be configured to position the vanes in a plurality of open positions. One such control system is described below with reference to FIG. 4. Each of the plurality of open positions may correspond to a different applied voltage and/or a different angle $\theta$ between the vanes and the substantially transparent substrate. The open position may correspond to a zero voltage level or a baseline voltage level.

Figure 2:
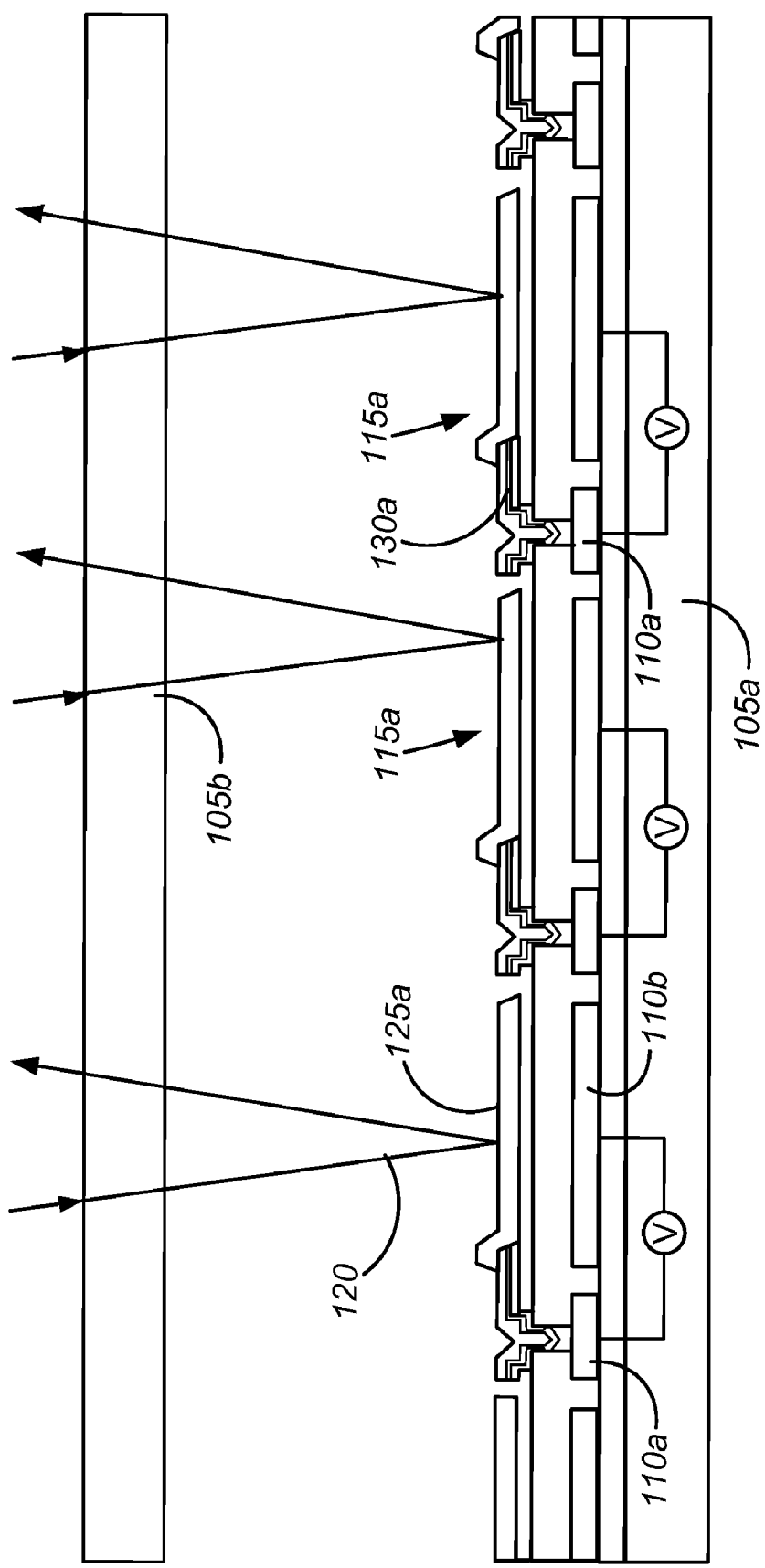
FIG. 2 depicts a cross-section of a smart window similar to that shown in FIG. 1, with vanes in a closed position.

FIG. 2 illustrates smart window 100 in a closed position. Here, a substantial amount of the incident light 120 that passes through substrate 105b is reflected from surfaces 125a and back out of smart window 100. (It will be appreciated that in some embodiments, ambient light may first enter substrate 105a.) Reflecting such ambient light may be desirable, for example, to prevent sunlight from entering at least some areas of smart window 100 on a hot day.

Figure 3:
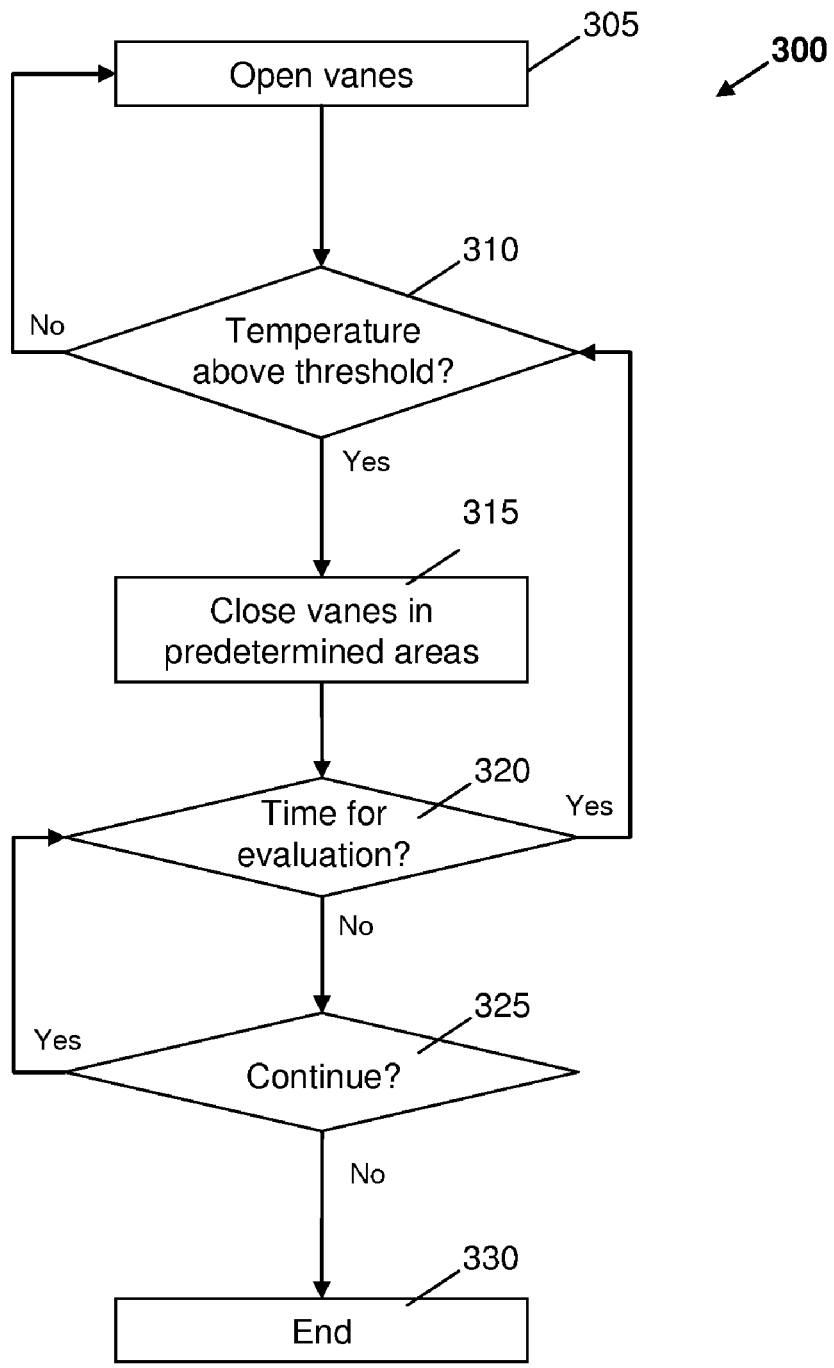
FIG. 3 is a flow chart that outlines some steps of a method for controlling a smart window.

Accordingly, some smart windows provided herein change their configurations automatically in response to temperature changes. FIG. 3 outlines the steps of one such method 300 that may be employed by some smart windows described herein. Like the steps of other methods shown and described herein, the steps of method 300 are not necessarily performed in the order indicated. Such methods may include more or fewer steps than are indicated. In some implementations, steps described herein as separate steps may be combined. Conversely, what may be described herein as a single step may be implemented in multiple steps.

In this example, the method starts with step 305, wherein the vanes of a smart window are in an open position. (In alternative methods, the vanes may initially be in a closed or an intermediate position.) In step 310, it is determined by a logic device of a logic system (e.g., by a processor, a programmable logic device, etc.) whether the temperature is above a predetermined threshold. This predetermined threshold may be configurable by a user, e.g., by setting the temperature on a thermostat or the like.

For example, one or more thermometers or other temperature sensors may provide temperature data to the logic device.

The logic device may receive the temperature data, compare the indicated temperature with a threshold temperature stored in memory (e.g., in a random access memory ("RAM") or the like) and determine whether the received temperature exceeds the threshold temperature. If not, the process returns to step 305 and the vanes remain open. The evaluation of step 310 may be made again, e.g., after a predetermined time.

However, if it is determined in step 310 that the temperature is above the predetermined threshold, the process continues to step 315. In this example, the response will be to close the vanes, at least partially, in predetermined areas of the smart window. For example, step 315 may involve closing the vanes in a predetermined percentage of the smart window, such as 5%, 10%, 20%, 25%, 50%, 75%, 80%, 90%, etc., of the area of the smart window.

The percentage may depend on the degree to which the actual temperature exceeds the threshold temperature. In one such example, vanes may be closed in 10% of the smart window's area for each degree that the temperature is above the predetermined threshold. In this example, if the temperature exceeds the predetermined threshold by 2 degrees, vanes will be closed in 20% of the smart window's area. In other examples, a different ratio of temperature to area may be used, e.g., the vanes may be closed in 5%, 15%, 20% or 25% of the smart window's area for each degree that the temperature is above the predetermined threshold. Other methods may involve non-linear relationships between temperature and smart window areas.

Here, the temperature will be evaluated again after a predetermined time has elapsed. It is determined in step 320 whether it is time for such an evaluation. If so, the process returns to step 310 and it is once again determined whether the temperature is above the predetermined threshold. Preferably, at least one of the temperature sensors is located inside an interior space that is defined by the smart window, i.e., the interior space of a room, of a building, etc. If so, the smart window may be provided with temperature data that indicate how the interior temperature changes in response to the vane configuration.

In step 325, it is determined whether the process will continue. For example, a different set of instructions may apply to different times of the day or night. At night, for example, the smart window may be configured to close all of the vanes in all of the areas of the smart window. Different instructions may apply when people or animals are not expected to be within the building, e.g., during a vacation period, when a person is away at work, etc. Accordingly, the determination of step 325 may be made with reference to a time, to a date, to the amount of ambient light, etc. If it is determined that the process will continue, the process returns to step 320. If not, the process ends.

Figure 4:
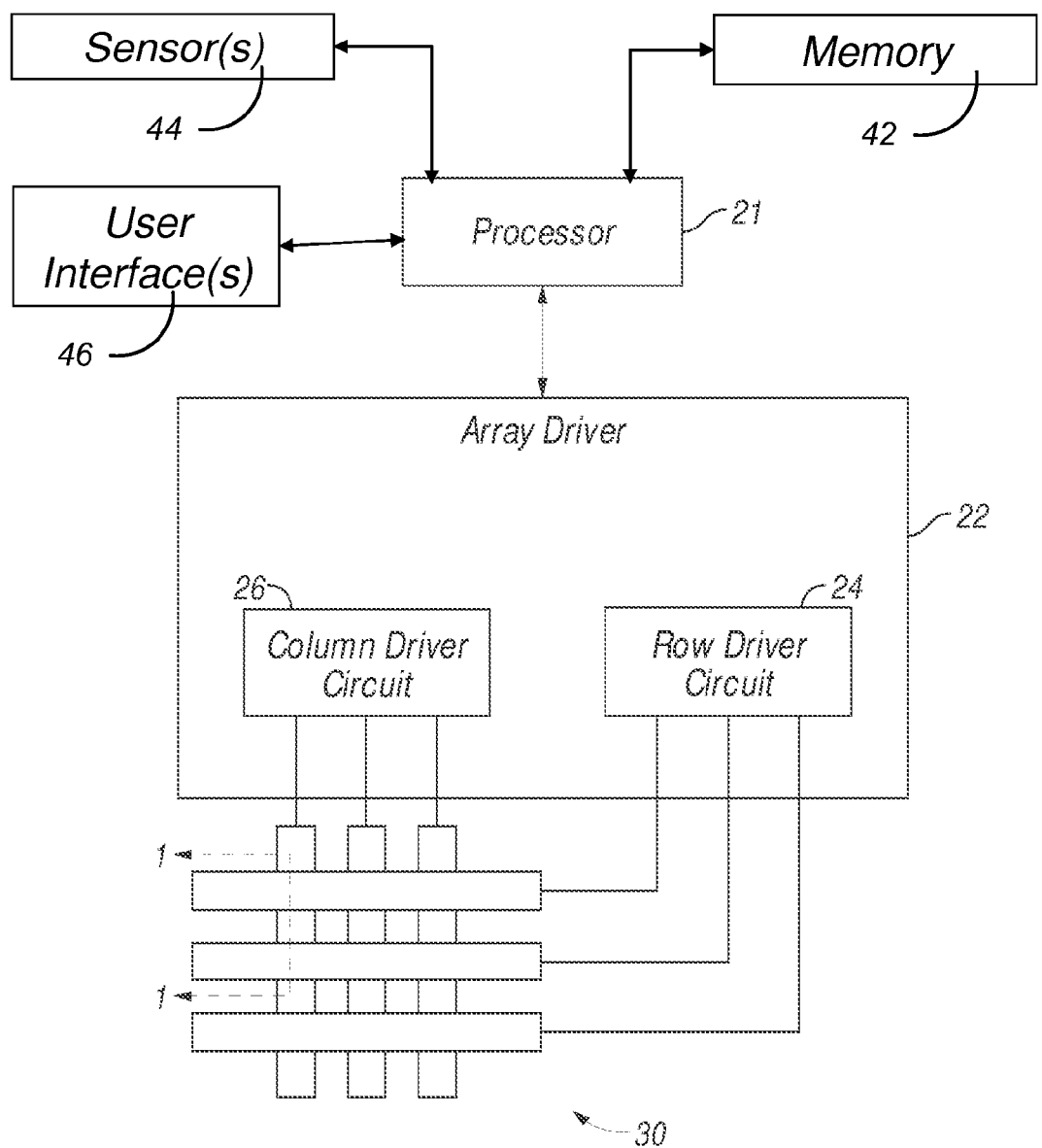
FIG. 4 is a block diagram that illustrates components that may be used to implement, at least in part, functionality of a smart window.

FIG. 4 is a system block diagram illustrating examples of components that may be used in some smart window embodiments. For example, the components illustrated in FIG. 4 may be used to implement, at least in part, method 300. In this example, system 30 includes logic system 21, which includes a processor in this example. Logic system 21 may comprise one or more logic devices such as a microprocessor that uses the ARM architecture of ARM Limited, one or more processors of Intel's Pentium® family, such as a Pentium II®, a Pentium III®, a Pentium IV®, a Pentium® Pro, an 8051, a processor using the MIPS® architecture, a Power PC®, an ALPHA®, or a special purpose microprocessor such as a digital signal processor, a microcontroller, or a programmable gate array.

Logic system 21 may be configured to execute one or more software modules that are encoded on one or more machine-readable media, such as memory 42, an on-chip memory, etc. For example, logic system 21 may be configured to execute one or more software modules for controlling, and responding to signals from, user interface 46. Logic system 21 may, e.g., receive instructions from a user via user interface 46 regarding a desired threshold temperature, regarding times and/or circumstances when the smart window be configured to block or transmit light, etc. Logic system 21 may receive information from sensor(s) 44 to determine temperature, ambient light intensity, etc.

In this example, logic system 21 is also configured for communication with array driver 22. Here, array driver 22 includes a row driver circuit 24 and a column driver circuit 26 that control the voltages applied to electrodes in rows and columns of a smart window. For example, column driver circuit 26 may be configured to provide separate signals to each of column areas 505 of smart window 100a (see FIG. 5A). Similarly, row driver circuit 24 may be configured to provide separate signals to each of row areas 510 of smart window 100b (see FIG. 5B). In some implementations, the combined effects of row driver circuit 24 and column driver circuit 26 can allow each of cells 515 to be separately controlled. (See FIG. 5C.)

Column areas 505, row areas 510 and cells 515 are examples of the "areas" that are referred to generally in FIG. 3. Alternative implementations provide smart windows with different area sizes, shapes, etc. For example, although only a few column areas 505, row areas 510 and cells 515 are depicted in smart windows 100a-100c, the actual number could be smaller, larger or much larger, according to the desired implementation. For example, alternative smart windows may include less than 10 areas, more than 100 areas, thousands or areas, tens of thousands of areas, etc. Accordingly, the scale of such areas may vary from embodiment to embodiment. Some smart windows may provide areas on the scale of centimeters in length or width, whereas others may have areas on the scale of millimeters or less in length or width. Some such smart windows may have areas that measure, e.g., 50 to 500 microns on a side.

Figure 6A:
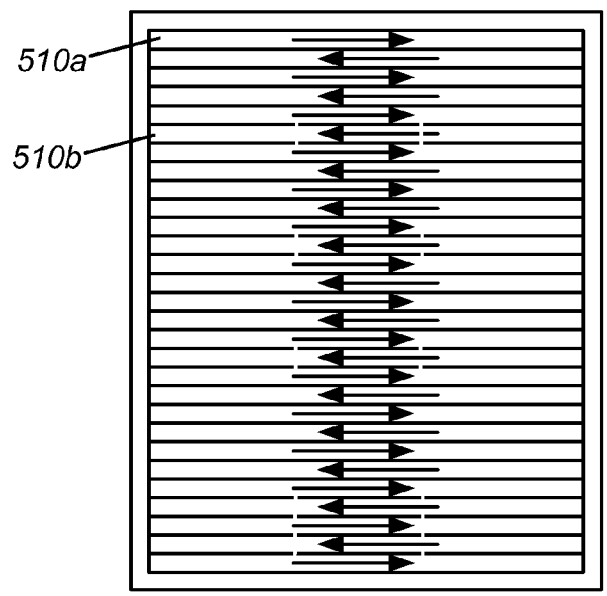
FIG. 6A provides another example of a smart window having separately addressable zones, wherein vanes of adjacent zones have different orientations.
Figure 6B:
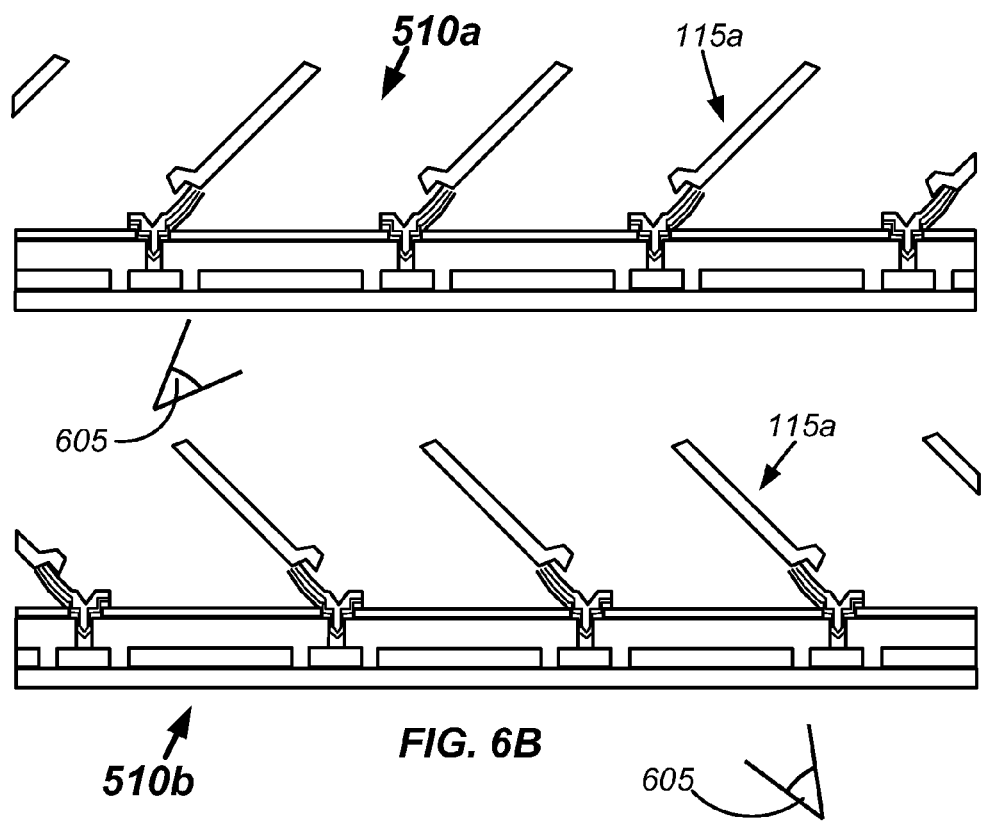
FIG. 6B provides an example of how vanes of adjacent zones may be oriented in one example of a smart window such as that depicted in FIG. 6A.

Moreover, the configuration of adjacent areas may vary in some implementations. Referring now to FIG. 6A, row areas 510a comprise different configurations from those of row areas 510b. Here, the vanes 115a of row areas 510a have a first orientation and the vanes 115a of row areas 510b have a second orientation. (See FIG. 6B.) Such implementations provide viewer 605 with a wider overall field of view. The overall field of view provided to view 605 would be the sum of the viewing angles provided by row areas 510a and the viewing angles provided by row areas 510b. Alternative implementations involve cells 515 having vanes 115a with multiple orientations (e.g., up, down, left and right).

In some embodiments, a smart window may be configured to selectively block or pass predetermined wavelengths of light. For example, the window may be configured to block or pass ultraviolet and/or infrared wavelengths of light. According to some such embodiments, the vanes may reflect light that is visible to humans but may pass predetermined wavelengths of light outside the visible range. Alternatively, or additionally, the window may comprise one or more films, filters, etc., configured to block or pass predetermined wavelengths of light. According to some such embodiments, the window may include a MEMS array configured to selectively block or pass predetermined wavelengths of light. Relevant MEMS arrays, control systems, etc., are described in U.S. patent application Ser. No. 12/255,423, entitled, "ADJUSTABLY TRANSMISSIVE MEMS-BASED DEVICES" and filed on Oct. 21, 2008 (see, e.g., FIGS. 7A through 16 and the corresponding description), which is hereby incorporated by reference.

Figure 7A:
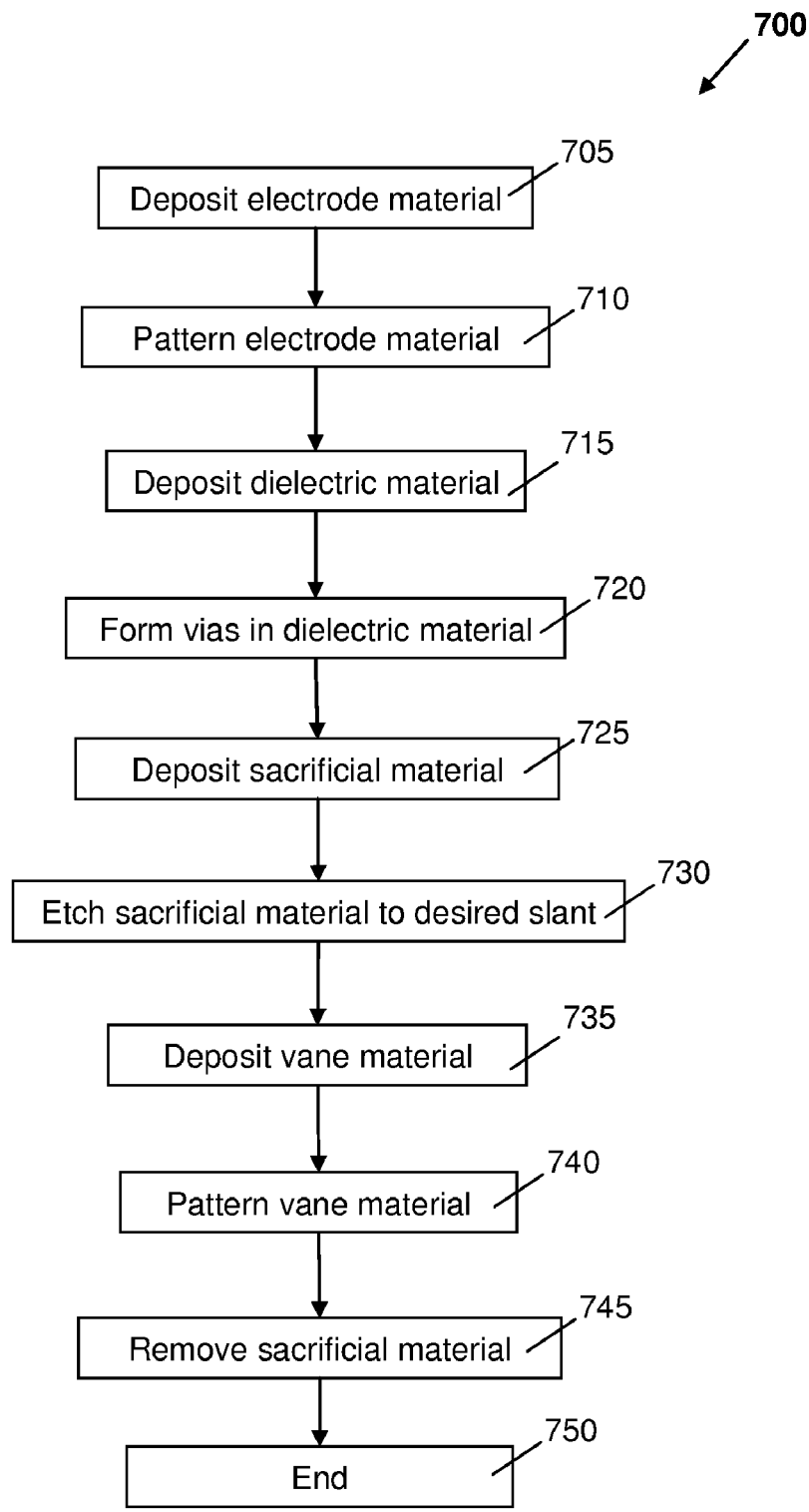
FIG. 7A is flow chart that outlines one example of a method for forming components of a smart window.

The first of a series of methods for manufacturing smart windows will now be described. Steps of one such method 700 are set forth in the flow chart of FIG. 7A. Some intermediate stages of smart window fabrication according to the steps of method 700 are depicted in FIGS. 7B and 7C. Referring first to FIG. 7A, electrode material is deposited on substantially transparent substrate 105a. (Step 705.) The electrode material is then patterned, forming electrodes 110a and 110b. (Step 710; see electrodes 110a and 110b of FIG. 7B.)

An insulating layer is then deposited on the electrodes. (Step 715; see dielectric layer 140 of FIG. 7B.) In step 720, vias are formed in the insulating layer. (See vias 735 of FIG. 7B.) In alternative implementations, the vias may be formed at a later stage, e.g., after deposition of the sacrificial material.

However, in this example, sacrificial material is then deposited (step 725) and etched to a desired angle with respect to the substrate. (Step 730; see sacrificial material 740 of FIG. 7B.) In some implementations, the sacrificial material is etched to a desired slant angle according to an anisotropic etching process, e.g., a reactive ion etching ("RIE") process.

Vane material may then be deposited (step 735) on the sacrificial material and patterned into desired vane shapes (step 740). In this example, three layers of vane material are deposited. Referring now to FIG. 7C, conductive and reflective layer 745a is first deposited on the sacrificial material and into vias 735. This step allows the resulting vanes to be configured for electrical connectivity with electrodes 110a. Dielectric layer 750 is then applied, followed by conductive and reflective layer 745b. Unlike the vanes depicted in FIGS. 1 and 2, the resulting vanes do not include or require a hinge area.

In step 745, the sacrificial material is then removed. As the sacrificial material is removed, the resulting vanes 115 are released. Vanes 115 are in a rest position when open and may be closed by applying a sufficient voltage across electrodes 110a and 110b to draw vanes 115 down to the insulating layer 140. The resulting structure may be used as one surface of a smart window. The remaining fabrication steps (not shown) may involve, e.g., connecting the sensor(s), the logic system, etc., cutting the structure to an appropriate size for a window pane, fitting the cut piece into a frame with another substantially transparent substrate, etc.

Figure 8A:
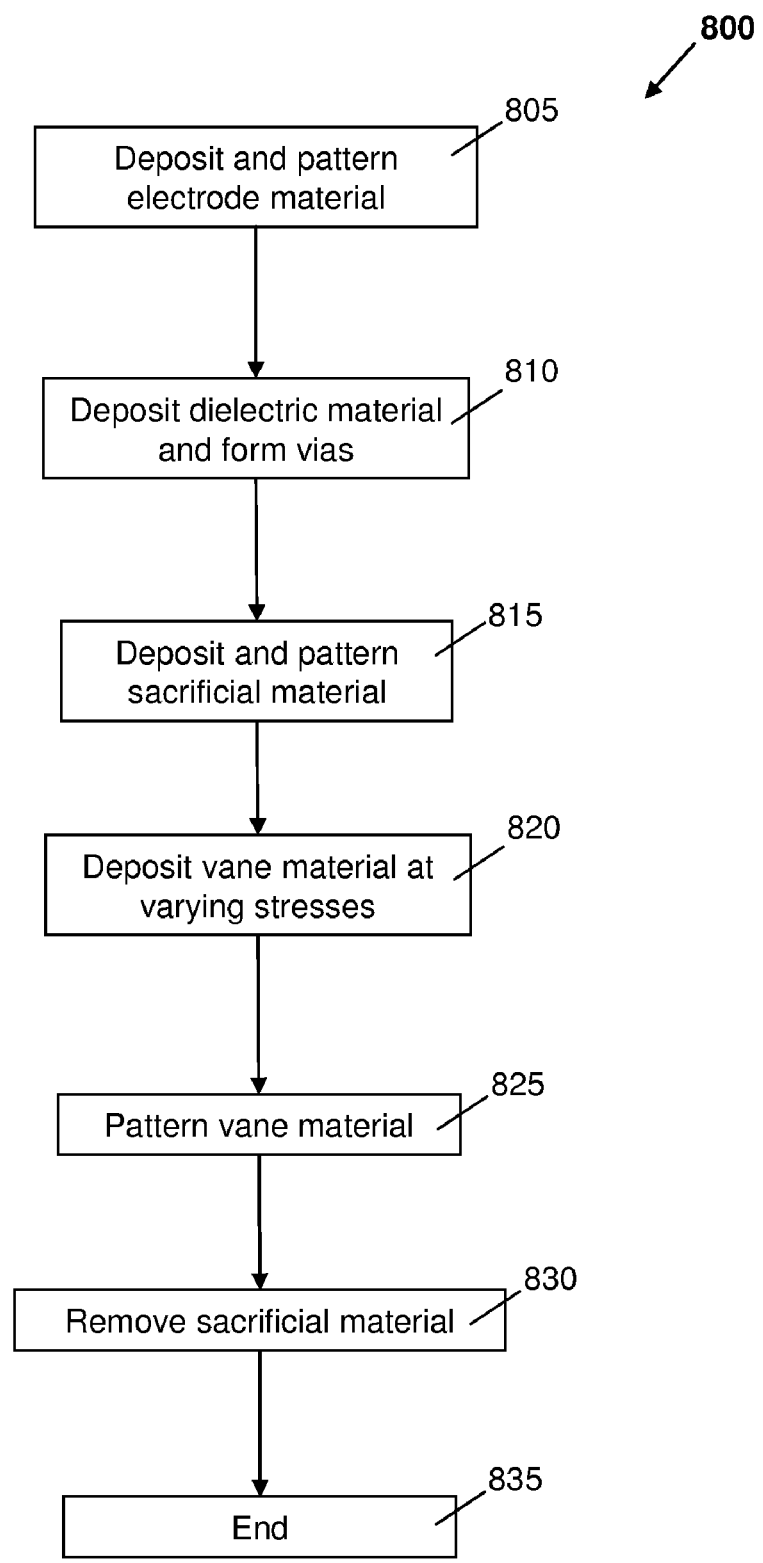
FIG. 8A is flow chart that outlines another example of a method for forming components of a smart window.

An alternative method for fabricating smart windows will now be described with reference to FIGS. 8A-8C. Steps 805 and 810 of method 800 (see FIG. 8A) may be substantially similar to steps 705-720 of method 700. In step 805, electrode material is deposited and patterned. Dielectric material is then deposited and vias are formed. (Step 810.)

However, the next steps of method 800 may be substantially different from those of method 700. In step 815, a layer of sacrificial material is deposited and patterned. (See layer 740 of FIG. 8B.) The thickness of the sacrificial layer may be substantially less than that of method 700. Accordingly, method 800 has the advantage of requiring less sacrificial material—and therefore less fabrication time—than method 700.

In step 820, vane material is deposited at varying stresses. For example, the vane material may be deposited according to a chemical vapor deposition ("CVD") process wherein stress is controlled by varying the power that is used to strike a plasma. This power control will determine the density—and hence the stress—of the film that is deposited. In one example, the gases $SiH_4$ and $N_2O$ are used to make the reactive species Si and O (oxygen) in a plasma to deposit on the substrate. In alternative implementations, other parameters (such pressure and/or gas flow) may be varied in order to deposit vane material at varying stresses. However, it may be easier to control the stress by varying the applied power, because there is a generally linear relationship between the applied power and the induced stress.

The vane material is patterned in step 825. When the sacrificial layer is removed (step 830), the resulting vanes 115 are released. Due to the induced stresses, vanes 115 will curl into an open position when released. Accordingly, vanes 115 will tend to remain in this open position unless a sufficient voltage is applied across electrodes 110a and 110b.

Figure 9A:
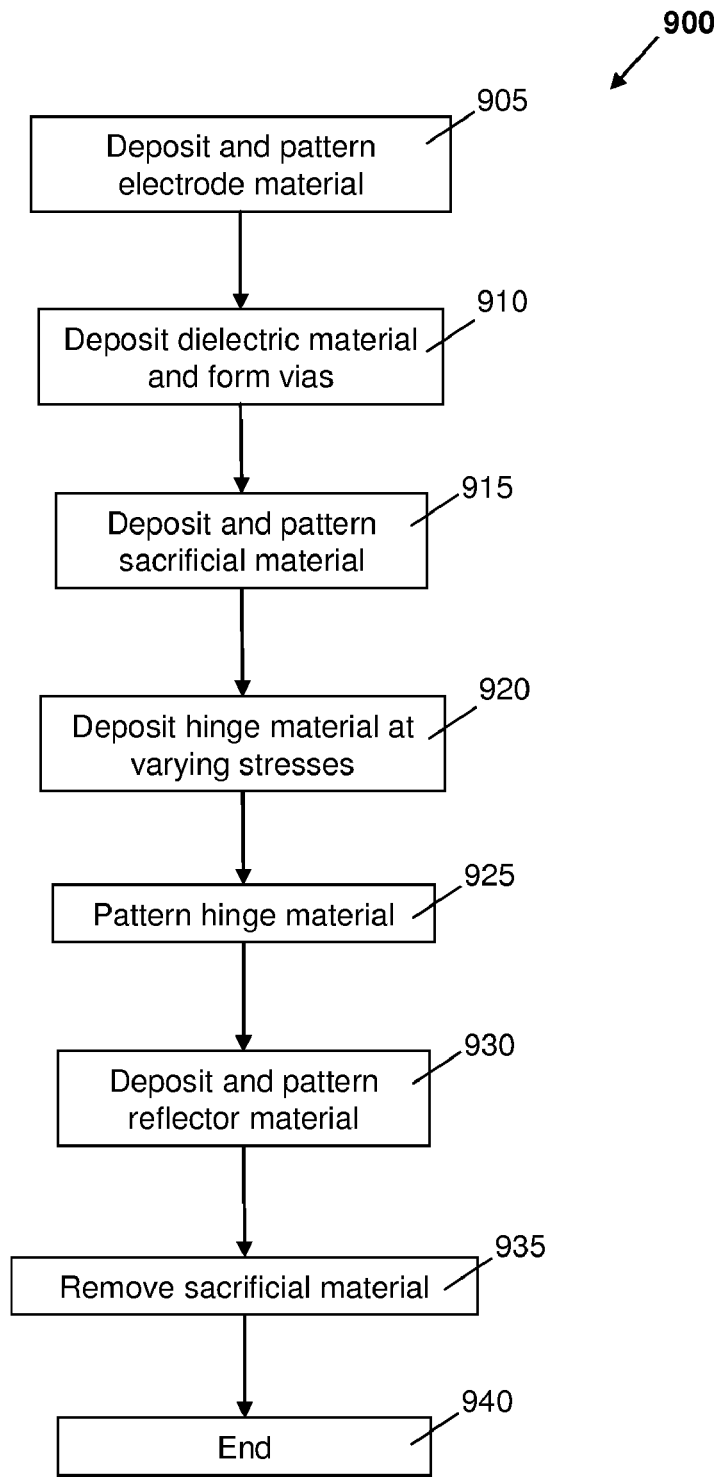
FIG. 9A is flow chart that outlines yet another example of a method for forming components of a smart window.
Figure 9B:
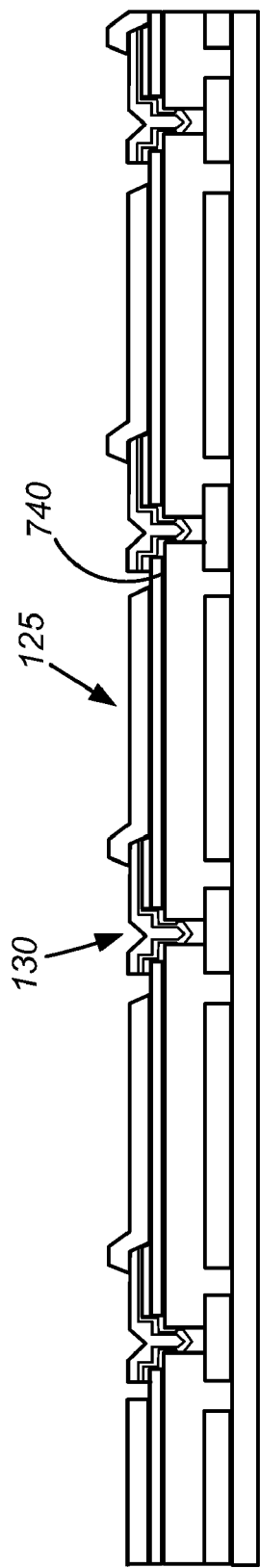
FIGS. 9B and 9C illustrate two stages of the method of FIG. 9A.
Figure 9C:
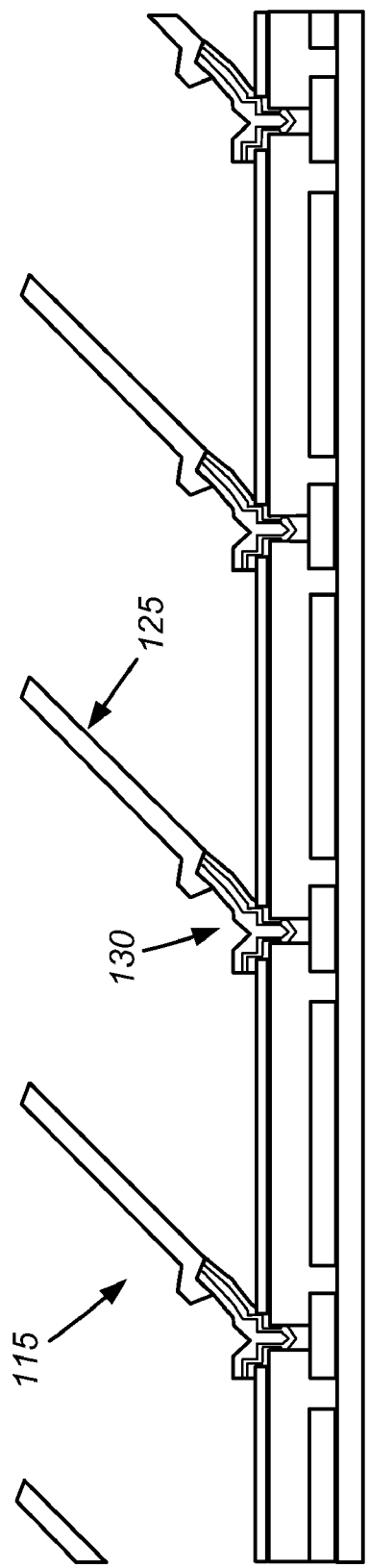

Another method for fabricating smart windows will now be described with reference to FIGS. 9A-9C. Steps 905 through 915 (see FIG. 9A) may be performed in a similar fashion to steps 805 through 815 of method 800. However, instead of depositing all of the vane material a varying stresses, in step 920 only hinge material is deposited at varying stresses. The hinge material is patterned (step 925) and then reflector material is deposited and patterned. (Step 930.) The reflector material may be, for example, a metal as described above with reference to FIG. 1. Examples of the resulting hinge areas 130 and reflective portions 125 are depicted in FIGS. 9B and 9C.

After sacrificial layer 740 is removed, the stresses induced in hinge portions 130 will allow hinge portions 130 to curl up, causing vanes 115 to lift. (See FIG. 9C.) However, because stresses were not induced in the entire length of vanes 115, reflective portions 125 may remain relatively straight. This may allow reflective portions 125 to reflect light through the smart windows with less distortion than a curved vane.

Figure 10:
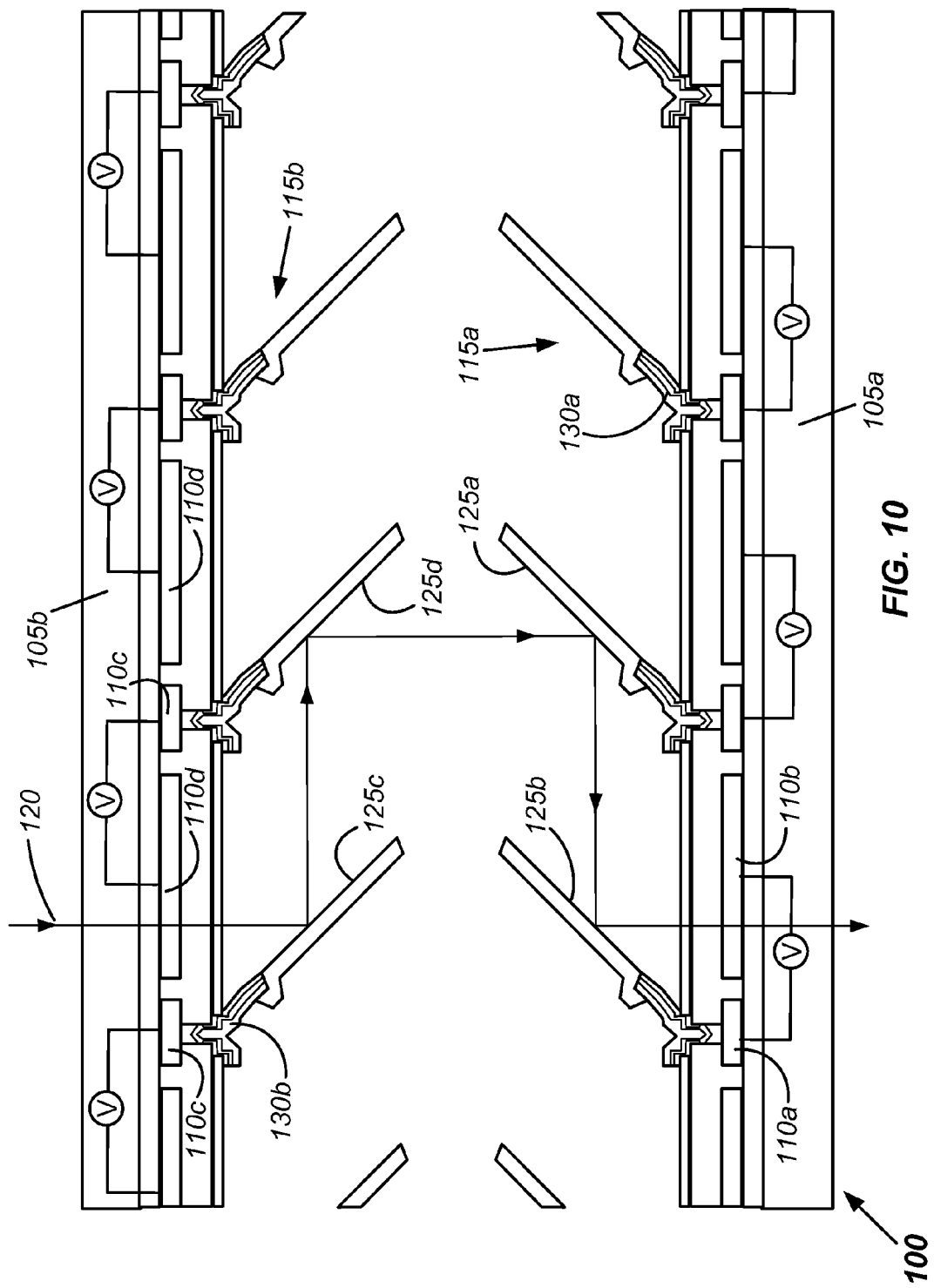
FIG. 10 depicts a cross-section of an alternative example of a smart window, with vanes in an open position.

FIG. 10 depicts yet another smart window embodiment. Like the smart windows depicted in FIGS. 1 and 2, electrodes 110a and 110b, vanes 115a, etc. are formed on substantially transparent substrate 105a. Here, however, smart window 100 also includes corresponding features formed on substantially transparent substrate 105b, including vanes 115b, hinges 130b, etc. Accordingly, light that enters substantially transparent substrate 105b may be reflected from reflective surface 125c of a first vane 115b to reflective surface 125d of an adjacent vane 115b. Some of light 120 may then enter substantially transparent substrate 105a directly. However, some of light 120 may then be reflected to reflective surface 125a of a first vane 115a, then to reflective surface 125b of an adjacent vane 115a, then through substantially transparent substrate 105a.

Although illustrative embodiments and applications of this invention are shown and described herein, many variations and modifications are possible which remain within the concept, scope, and spirit of the invention, and these variations should become clear after perusal of this application. For example, while the smart windows herein have vanes that are illustrated as being disposed on one surface (e.g., an interior surface) of a substantially transparent substrate, alternative smart windows feature vanes disposed on another surface (e.g., an exterior surface) of a substantially transparent substrate. Moreover, while some smart windows depicted herein have been shown to have rectangular zones, alternative smart windows may have other zone shapes, e.g., triangular shapes, other polygonal shapes, curvilinear shapes, etc. Accordingly, the present embodiments are to be considered as illustrative and not restrictive, and the invention is not to be limited to the details given herein, but may be modified within the scope and equivalents of the appended claims.

We claim:

1. An apparatus, comprising:
a first substantially transparent substrate;

a first plurality of substantially transparent electrodes attached to the first substrate;

a first plurality of reflective and electrically conductive vanes having first ends that are electrically coupled to first areas of the first plurality of electrodes; and a control system configured to apply a first voltage between the first areas of the first plurality of electrodes and second areas of the first plurality of electrodes at a first time, the first voltage causing first electrical forces between the first plurality of vanes and second areas of the first plurality of electrodes that are greater than restoring forces of the first plurality of vanes and sufficient to move the first plurality of vanes from an open position to a closed position proximate the second areas of the first plurality of electrodes, wherein the first plurality of vanes is configured to reflect ambient light through the first plurality of electrodes when in the open position and to block ambient light when in the closed position.

2. The apparatus of claim 1, wherein the control system is further configured to apply a second voltage between the first areas of the first plurality of electrodes and the second areas of the first plurality of electrodes at a second time, the second voltage causing second electrical forces that are less than the restoring forces of the first plurality of vanes and that allow the first plurality of vanes to return to the open position.

3. The apparatus of claim 2, wherein the first time and the second time are predetermined times.

4. The apparatus of claim 2, wherein the control system is configured to open and close the first plurality of vanes in response to temperature changes.

5. The apparatus of claim 2, wherein the control system is configured to position the first plurality of vanes in a plurality of open positions, each of the plurality of open positions corresponding to a different angle between the first plurality of vanes and the first substrate.

6. The apparatus of claim 1, wherein the first plurality of vanes and the first plurality of electrodes comprise electromechanical systems.

7. The apparatus of claim 6, wherein the electromechanical systems comprise microelectromechanical systems.

8. The apparatus of claim 1, further comprising a substantially transparent insulating layer formed on the second areas of the electrodes, wherein the first plurality of vanes is proximate the insulating layer when in the closed position.

9. A window comprising the apparatus of claim 1.

10. The apparatus of claim 9, wherein the window is configured to selectively block or pass predetermined wavelengths of light.

11. The window of claim 9, wherein first window areas pass ambient light of a first angle range and wherein second window areas block ambient light of the first angle range.

12. The apparatus of claim 1, wherein:

each of the first plurality of vanes comprises a first side and a second side; and when in the open position, at least some of the first plurality of vanes are configured to reflect ambient light from a first side of a first vane to a second side of a first adjacent vane and through the second area of the electrodes.

13. The apparatus of claim 12, further comprising:

a second substantially transparent substrate;

a second plurality of substantially transparent electrodes attached to the second substrate; and a second plurality of reflective and electrically conductive vanes having first ends that are electrically and mechanically coupled to first areas of the second plurality of electrodes, wherein:

each of the second plurality of vanes comprises a first side and a second side;

when in the open position, at least some of the second plurality of vanes are configured to reflect ambient light from a first side of a second vane to a second side of a second adjacent vane of the second plurality of vanes; and the second adjacent vane of the second plurality of vanes is configured to reflect the ambient light to the first side of one of the first plurality of vanes.

14. A smart window, comprising:

substantially transparent support means;

light reflecting means; and control means configured for providing a first electrical force at a first time that is greater than a restoring force of the light reflecting means and sufficient to move the light reflecting means from an open position to a closed position, wherein the light reflecting means is configured to reflect ambient light through the support means when the light reflecting means is in the open position and to block ambient light when the light reflecting means is in the closed position.

15. The smart window of claim 14, wherein the control means is further configured for providing a second electrical force at a second time that is less than the restoring force and that allows the light reflecting means to return to the open position.

16. The smart window of claim 15, wherein the first time and the second time are predetermined times.

17. The smart window of claim 15, further comprising means for determining temperature changes, wherein the control means is configured to open and close the first plurality of vanes in response to temperature changes.

18. The smart window of claim 14, wherein the light reflecting means comprises electromechanical systems.

19. The smart window of claim 18, wherein the electromechanical systems comprise microelectromechanical systems.

20. The smart window of claim 14, further comprising means for blocking or passing predetermined wavelengths of light.

21. The smart window of claim 14, wherein the control means is further configured to control first window areas to pass ambient light of a first angle range and to control second window areas to block ambient light of the first angle range.

* * * * *